(12) United States Patent
Yang

(10) Patent No.: US 11,557,803 B2
(45) Date of Patent: Jan. 17, 2023

(54) HORIZONTAL COMPOSITE ELECTRICITY SUPPLY STRUCTURE

(71) Applicants: PROLOGIUM TECHNOLOGY CO., LTD., Taoyuan (TW); PROLOGIUM HOLDING INC., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 106 days.

(21) Appl. No.: 16/535,193

(22) Filed: Aug. 8, 2019

(65) Prior Publication Data
US 2020/0052000 A1 Feb. 13, 2020

(30) Foreign Application Priority Data

Aug. 8, 2018 (TW) .................................. 107127703
Oct. 11, 2018 (TW) .................................. 107135860

(51) Int. Cl.
*H01L 27/12* (2006.01)
*H01L 27/24* (2006.01)
(Continued)

(52) U.S. Cl.
CPC ..... *H01M 50/116* (2021.01); *H01M 50/1243* (2021.01); *H01M 50/155* (2021.01)

(58) Field of Classification Search
None
See application file for complete search history.

(56) References Cited

U.S. PATENT DOCUMENTS 4,777,101 A * 10/1988 Blomberg ......... H01M 10/0418
                                                    429/129
5,264,305 A * 11/1993 Charkey ............. H01M 10/282
                                                    429/152
(Continued)

FOREIGN PATENT DOCUMENTS

CN      103187370    *  6/2016   ............. H01L 23/28
JP      2007-194090  *  8/2007   ............. H01M 4/02
(Continued)

*Primary Examiner* — Amanda J Barrow
(74) *Attorney, Agent, or Firm* — Rabin & Berdo, P.C.

(57) ABSTRACT

The present disclosure relates to a horizontal composite electricity supply structure, which comprises a first insulation layer, a second insulation layer, two electrically conductive layers, and a plurality of electrochemical system element groups. The two electrically conductive layers are disposed on the first and second insulation layers, respectively. The electrochemical system element groups are disposed between the first insulation layer and the second insulation layer, and connected in series and/or in parallel via the electrically conductive layers. The electrochemical system element group is formed by several serially connected electrochemical system elements. Each electrochemical system element includes a package layer on the sidewall, so that their electrolyte systems do not circulate with one another. Thereby, the high voltage produced by connection will not influence any single electrochemical system element nor decompose their respective electrolyte systems. Hence, serial and/or parallel connections are made concurrently in the horizontal composite electricity supply structure.

13 Claims, 18 Drawing Sheets

A

(51) Int. Cl.
*H01M 50/116* (2021.01)
*H01M 50/124* (2021.01)
*H01M 50/155* (2021.01)

(56) References Cited

U.S. PATENT DOCUMENTS

| | | | | |
|---|---|---|---|---|
| 6,074,774 | A * | 6/2000 | Semmens | H01M 10/0413 |
| | | | | 429/50 |
| 2010/0227208 | A1* | 9/2010 | Kim | H01G 9/02 |
| | | | | 429/94 |
| 2011/0300433 | A1* | 12/2011 | Kim | H01M 50/502 |
| | | | | 429/159 |
| 2012/0005882 | A1* | 1/2012 | Shimamura | H01M 6/485 |
| | | | | 29/623.4 |
| 2012/0021268 | A1* | 1/2012 | Mailley | H01M 50/531 |
| | | | | 429/94 |
| 2016/0315346 | A1* | 10/2016 | Sasaki | H01M 10/0562 |
| 2017/0040582 | A1* | 2/2017 | Kim | H01M 50/116 |
| 2018/0053926 | A1* | 2/2018 | Shaffer, II | H01M 10/18 |
| 2018/0151910 | A1* | 5/2018 | Zimmerman | H01M 10/0585 |
| 2018/0366770 | A1* | 12/2018 | Solan | H01M 10/0585 |
| 2019/0027732 | A1* | 1/2019 | Tsutsumi | H01M 10/613 |
| 2019/0074552 | A1* | 3/2019 | Matsumoto | H01M 50/531 |
| 2019/0237717 | A1* | 8/2019 | Boufnichel | H01M 10/46 |
| 2020/0052341 | A1* | 2/2020 | Yang | H01M 50/20 |
| 2020/0227789 | A1* | 7/2020 | Minamida | H01M 10/0585 |

FOREIGN PATENT DOCUMENTS

| | | | | |
|---|---|---|---|---|
| WO | WO 01/80338 | * | 10/2001 | H01M 6/18 |
| WO | WO 2012/038887 | * | 3/2012 | H01M 10/02 |

* cited by examiner

HORIZONTAL COMPOSITE ELECTRICITY SUPPLY STRUCTURE

FIELD OF THE INVENTION

The present invention relates generally to an electricity supply structure, and more particularly to a high-voltage and high-capacity horizontal composite electricity supply structure, which is formed by several serially connected electrochemical systems to achieve both series and parallel connection thereof.

BACKGROUND OF THE INVENTION

In recent years, due to the exhaustion of petrochemical fuels and the prevalence of the consciousness of environmental protection, people are forced to rethink how to balance between convenient life and environmental protection for those objects using petrochemical fuels as the power source and exhausting massive greenhouse gases. Cars, as important transportation vehicles, become one of the primary objects to be inspected. Accordingly, under the global trend of energy saving and carbon reduction, many countries worldwide set vehicle electrification as an important target for carbon dioxide reduction. Unfortunately, electric vehicles face many problems in practical applications. For example, the driving range of the electric vehicle is determined by the capacity of electricity supply elements. Therefore, more batteries should be connected in series or in parallel to increase the capacity for extending the mileage of the electric vehicle.

To extend mileage with lower weight, secondary batteries with high energy, density and light weight, such as lithium-ion secondary batteries, have become the best choice for the batteries of the electric vehicles. Nonetheless, how to assemble multiple lithium-ion secondary batteries to form a safe and stable power source has become an urgent challenge for people.

First, please refer to FIG. 1A and FIG. 1B, showing the common method. After multiple sets of the battery elements 71 are connected in parallel, the housing 72 is used for sealing and forming the battery cell 73. Then the conductive leads 74 protruding from the housings 72 of the battery cells 73 are connected in series externally to reach a sufficient voltage for the electric vehicle. According to another method, a single housing 72 is adopted for covering multiple battery elements 71, as shown in FIG. 2A and FIG. 2B. In other words, internal series connection is adopted for increasing the voltage of the battery cell 76. Then multiple battery cells 76 are externally connected in parallel to reach sufficient capacity for the electric vehicle. Unfortunately, current electrolyte can only sustain around 5 volts. Besides, it is difficult to form a closed system for the electrolyte due to internal structural problems. Once the voltage exceeds the sustainable range of the electrolyte, the electrolyte will decompose and make the battery module 77 fail. Even worse, the battery might explode. Accordingly, there is no such product in the market.

According to the US patent application No. 2004/0091771, adjacent battery modules share a common current collecting layer. By using this method, the problem of the electrolyte decomposition as described above can be solved. Unfortunately, owing to the series connection to the common current collecting layer, the design will be less flexible. Only internal series connection can be adopted. To form a battery module, the external parallel connection is needed to connect a plurality of battery cells.

Furthermore, according to a composite battery cells of Taiwan patent application No. 106136071, the series and parallel connections are made inside battery cells directly to achieve higher voltage and bigger specific capacity. The drawbacks of lower performance and reduced capacity density due to external connection according to the conventional battery structure is eliminated. Unfortunately, according to the application, a great number of electricity supply elements have to be vertically stacked for series and/or parallel connections to achieve high capacity and high voltage.

Nonetheless, le facing puncture of a metal object, the high voltage drop caused by puncture is unavoidable extremely dangerous for fully solid, pseudo solid (solid/liquid), or liquid electrolyte systems. It is particularly dangerous for battery cells formed by vertically stacking massive electricity supply elements internally.

To eliminate the drawbacks, the present disclosure provides a novel horizontal composite electricity supply structure for avoiding safety concerns caused by puncture of the battery elements resulting from metal objects.

SUMMARY

An objective of the present disclosure is to provide a horizontal composite electricity supply structure, which adopts series and/or parallel connections in the horizontal direction to connect electrically multiple electrochemical system element groups for reducing the number of vertically stacked electrochemical system elements and avoiding safety problems caused by punching by metal objects.

Another objective of the present invention is to provide a horizontal composite electricity supply structure. A first insulation layer and a second insulation layer are disposed at the top and bottom, respectively. Multiple electrochemical system element groups extending horizontally and connected in series and/or in parallel are disposed between the first and second insulation layers. By using the first and second insulation layers, the potential damage caused by punctures on the battery cells by external metal objects can be avoided.

Another objective of the present disclosure is to provide a horizontal composite electricity supply structure. No electrochemical reaction occurs between adjacent electrochemical system elements except for charge transfer. Thereby, the capacity density and voltage are improved by series and/or parallel connections without being limited by the maximum voltage of allowance of the electrolyte.

Still another objective of the present disclosure is to provide a horizontal composite electricity supply structure. Multiple channels are formed between the adjacent electrochemical system element groups to act as paths for heat dissipation.

A further objective of the present disclosure is to provide a horizontal composite electricity supply structure. The current collecting layers between the adjacent electrochemical system elements are shared for connection. The contact area is much larger than the one by soldering according to the conventional art. Thereby, the internal resistance of the electrochemical system element group can be reduced substantially. There is little loss in the performance of the power module formed by the electrochemical system element groups. In addition, because of the reduction of resistance, the charging and discharging speeds are increased significantly, and the heating problem is reduced significantly. Then the cooling system of the electrochemical system element group can be simplified and it is easier to manage and control the cooling system. Thereby, the reliability and safety of the overall composite electricity supply structure are enhanced.

To achieve the above objectives, the present disclosure provides a horizontal composite electricity supply structure, which comprises a first insulation layer, a second insulation layer, two electrically conductive layers, and a plurality of electrochemical system element groups. The second insulation layer is disposed opposed to the first insulation layer. The two electrically conductive layers are disposed on the inner surfaces of the first and second insulation layers, respectively, and face each other. The plurality of electrochemical system element groups are disposed between the first insulation layer and the second insulation layer, and connected in series and/or in parallel via the electrically conductive layers. Each electrochemical system element group is formed by one or more electrochemical system elements. A package layer is disposed on the periphery of each electrochemical system element, so that there is no circulation between adjacent electrochemical system elements except for charge transfer. Thereby, the electricity supply elements can connect in series and/or parallel without being limited by the maximum permissible voltage of the electrolyte system. Each electrochemical system element comprises an isolation layer, two active material layers, and the electrolyte system. The two active material layers are disposed on both sides of the isolation layer, respectively. The electrolyte system is disposed in the two active material layers. The electrochemical system elements on the two outermost sides of each electrochemical system element group adopt the electrically conductive layers as the current collecting layers.

In the following, concrete embodiment are described in detail for understanding the objective, technologies, feature, and the effects provided by the present disclosure.

DETAILED DESCRIPTION

Given the safety problem caused by puncture by sharp metal objects of multiple electrochemical system elements stacked vertically and connected serially to meet the demand for high voltage and high capacity, the present disclosure provides a novel horizontal composite electricity supply structure to solve the puncture problem.

The present disclosure mainly discloses a horizontal composite electricity supply structure, which comprises a plurality of electrochemical system element groups. The electrochemical system element group comprises one or more electrochemical system elements connected in series and/or in parallel via electrically conductive layers. Then, a first conductive terminal and a second conductive terminal are connected to electrochemical system element groups to form the composite electricity supply structure. In other words, inside the composite electricity supply structure, both series and parallel connections can be made. The electrochemical system elements of the electrochemical system element group according to the present disclosure do not share electrolyte systems with each other. Figures are used for further description. The above composite electricity supply structure can be any supply element capable of storing energy and supplying external devices, such as batteries or capacitors.

Figure 1B:
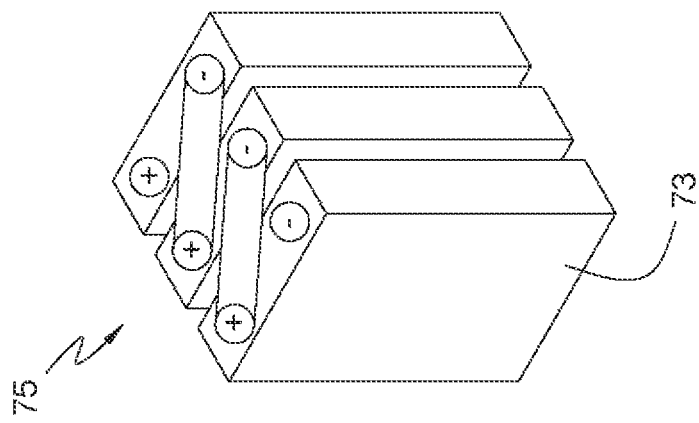
FIG. 1A and FIG. 1B show schematic diagrams of the battery cell and battery module according to the first embodiment according to the prior art.
Figure 1A:
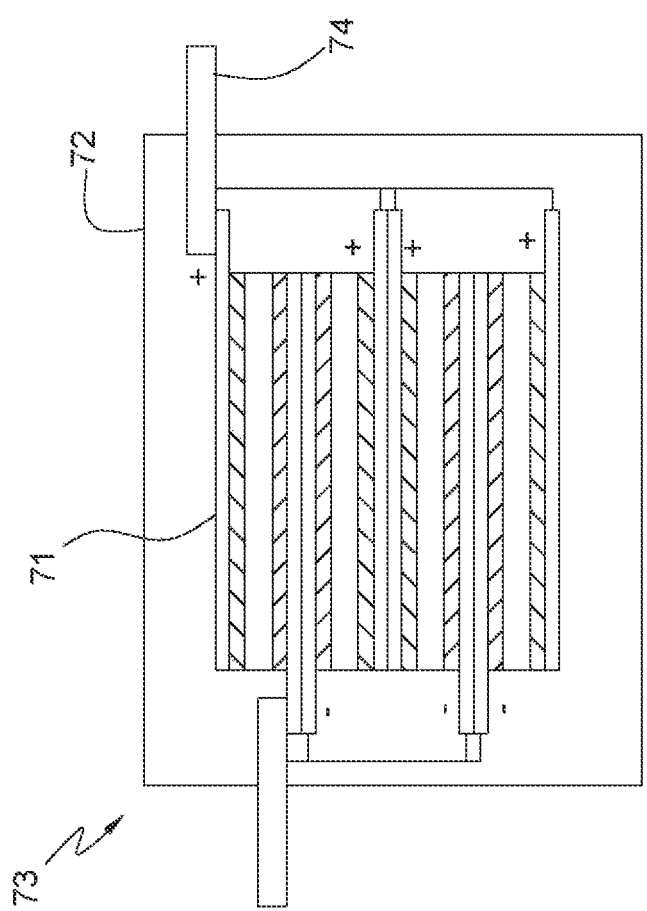
Figure 2B:
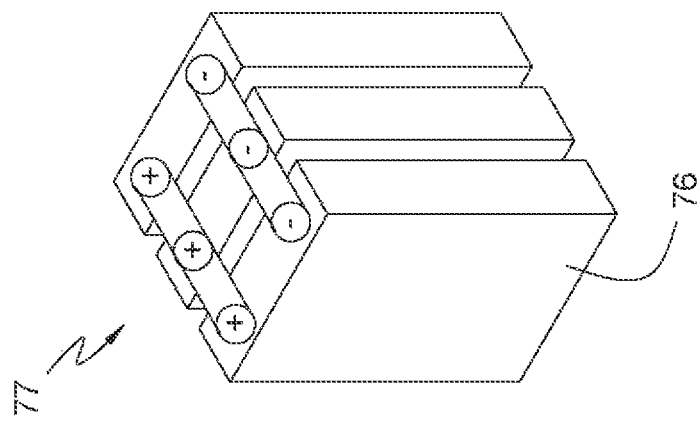
FIG. 2A and FIG. 2B show schematic diagrams of the battery cell and battery module according to the second embodiment according to the prior art.
Figure 2A:
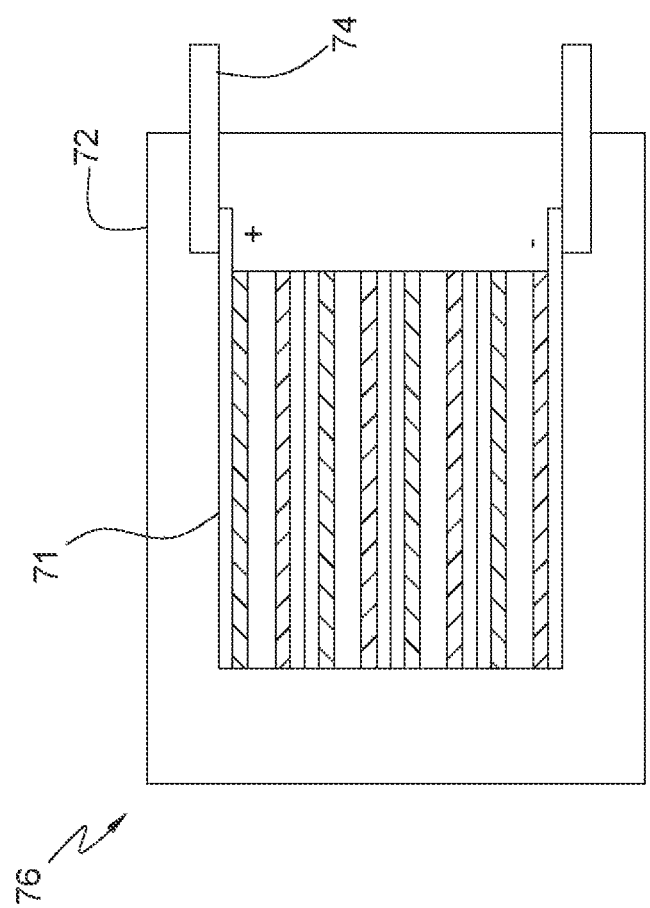
Figure 3:
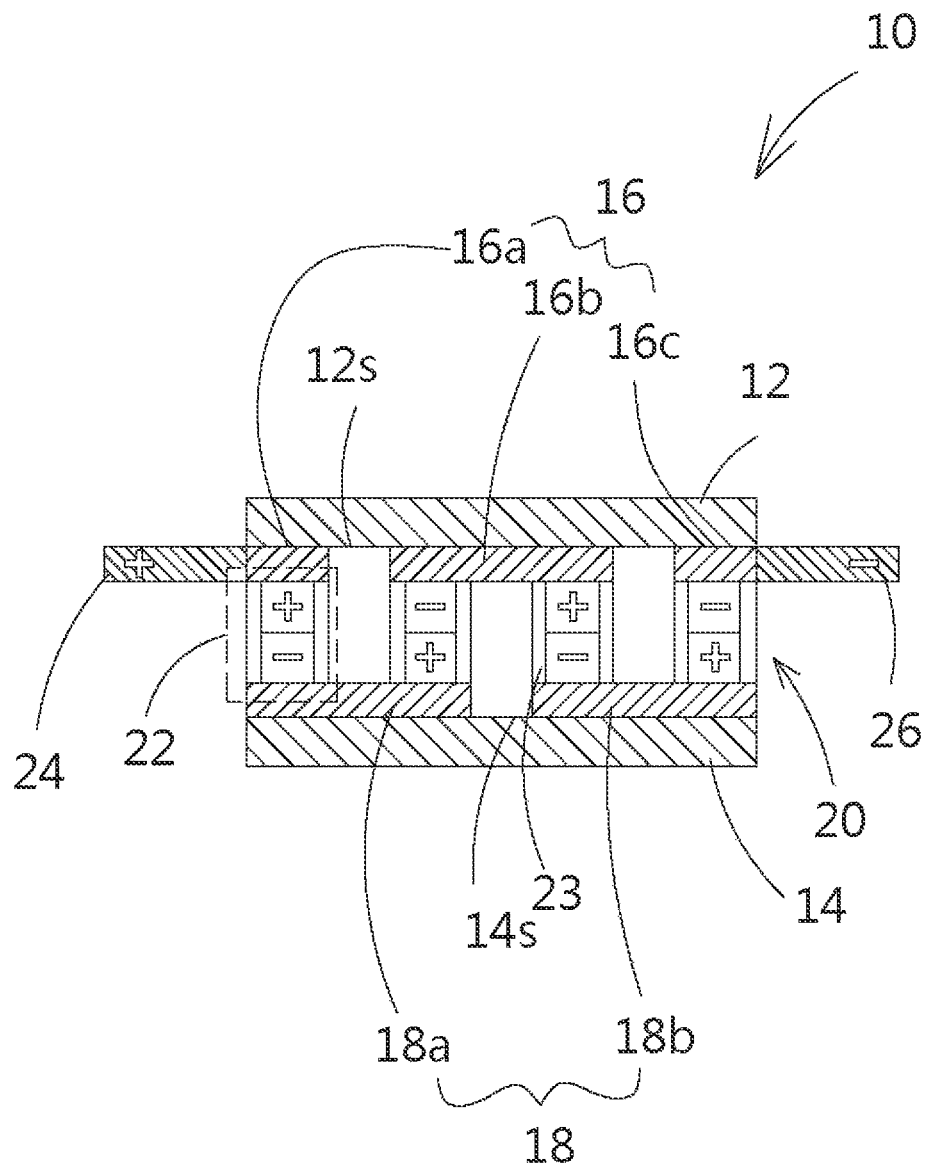
FIG. 3 shows a schematic diagram of the horizontal composite electricity supply structure according to the first embodiment of the present disclosure.

First, please refer to FIG. 3, which shows a schematic diagram of the horizontal composite electricity supply structure according to the first embodiment of the present disclosure. As shown in the figure, the horizontal composite electricity supply structure 10 according to the present disclosure mainly comprises a first insulation layer 12, a second insulation layer 14, an electrically conductive layer 16 (16a, 16b, 16c), another electrically conductive layer 18 (18a, 18b), and a plurality of electrochemical system element groups 20. The second insulation layer 14 is opposed to the first insulation layer 12 in the horizontal direction. The electrically conductive layer 16 is located on a first surface 12s extending horizontally inside the first insulation layer 12. The electrically conductive layer 18 is located on a second surface 14s extending horizontally inside the second insulation layer 14. The electrically conductive layer 16 is opposed to the electrically conductive layer 18. The material of the first and second electrically conductive layers 16, 18 may be selected from the group consisting of metals and any electrically conductive materials. The plurality of electrochemical system element groups 20 are sandwiched between the first and second insulation layers 12, 14 and connected electrically to the different polarity via the electrically conductive layers 16, 18 for forming series connection. For convenience, a battery is adopted in the following embodiment for description. A person having ordinary skill in the art knows well that the embodiment does not limit the scope of the present disclosure.

Figure 4A:
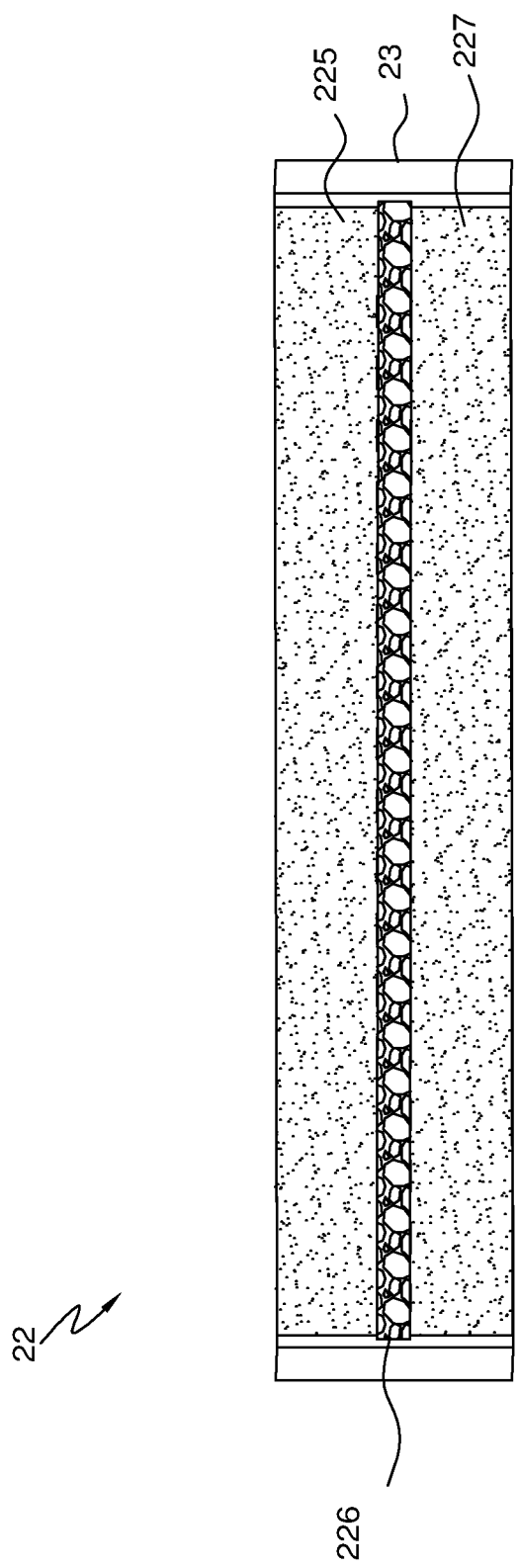
FIG. 4A shows a structural schematic diagram of the electrochemical system element and the package layer according to the present disclosure.

The electrochemical system element group 20 as described above is formed by one or more electrochemical system elements 22. For example, in FIG. 3, the horizontal composite electricity supply structure 10 is formed by four electrochemical system element groups 20 connected in series. Each one of the electrochemical system element groups 20 is formed by an electrochemical system element 22. The structure of the above electrochemical system element 22 is shown in FIG. 4A. Each electrochemical system element 22 includes a first active material layer 225, an isolation layer 226, a second active material layer 227, and an electrolyte system disposed in the first active material layer 225 and the second active material layer 227. The first active material layer 225 contacts the electrically conductive layer 16, and the second active material layer 227 is contacts the other electrically conductive layer 18. The isolation layer 226 is located between the first active material layer 225 and the second active material layer 227. A package layer 23 is disposed on the periphery of each electrochemical system element 22 so that there is no circulation between the electrolyte systems of the electrochemical system elements 22 except for charge transfer. Therefore, electrochemical reaction does not occur between the electrochemical system elements 22, and the electrochemical system elements 22 can connect in series and/or in parallel without being limited by the maximum permissible voltage of the electrolyte system.

The materials of the isolation layer 226 include polymer materials, ceramic materials, and glass fiber materials. Also, the isolation layer 226 has micro holes to permit ion migration. The micro holes are formed by through holes, nonlinear holes, or even made by porous materials. In addition, porous ceramic insulative materials cart be distributed inside the micro holes of the substrate. The ceramic insulative materials can be formed by materials such as micrometer- or nanometer-scale titanium dioxide ($TiO_2$), aluminum oxide ($Al_2O_3$), silicon dioxide ($SiO_2$), or alkylated ceramic particles. The ceramic insulative materials can further include polymer adhesives, such as polyvinylidene fluoride (PVDF), polyvinylidene fluoride-co-hexafluoropropylene (PVDF-HFP), polytetrafluoroethylene (PTFE), acrylic acid glue, epoxy, polyethylene oxide (PEO), polyacrylonitrile (PAN), or polyimide (PI).

The electrolyte system is disposed in the first and second active material layers 225, 227. The form of the electrolyte system is selected from the group consisting of liquid state, pseudo solid state, gel state, solid state or combinations thereof. The active materials of the active material layers 225, 227 can convert chemical energy to electrical energy for usage (supplying electricity) or electrical energy to chemical energy for storage (charging), and can achieve ion conduction and transport concurrently. The generated electrons can be led outward via the adjacent current collecting layers.

The material of the package layer 23 includes epoxy, polyethylene, polypropylene, polyurethane, thermoplastic polyimide, silicone, acrylic resin, or ultraviolet-hardened glue. The package layer 23 is disposed on the periphery of the electrochemical system element 22 with two ends glued to the current collecting layers on both sides of the electrochemical system element 22. According to the present embodiment, the package layer 23 is glued to the electrically conductive layers 16, 18 for sealing the electrolyte system between the electrically conductive layers 16, 18 and the package layer 23 for avoiding leakage and circulation with the electrolyte system of other electrochemical system elements 22. Thereby, the electrochemical system element 22 is an independent and complete electricity supply module.

To improve the sealing effect of the package layer 23, the package layer 23 can be designed to have three layers. Please refer to FIG. 4B. The top and bottom layers are two modified silicone layers 23a, 23c and the middle layer is a silicone layer 23b. The modified silicone layers 23a, 23c on both sides are modified by adjusting the ratio of addition and condensation silicone for gluing different materials. By using the design, the adhesion at the interface is increased. At the same time, the overall appearance is more complete and the production yield is improved. Furthermore, the design can block permeation of moisture from outside. Internally, the silicone layer 23b acts as the main structure to block damage caused by the polar solvent and the plastic agent from inside. Thereby, the overall sealing structure can be more complete.

Figure 4B:
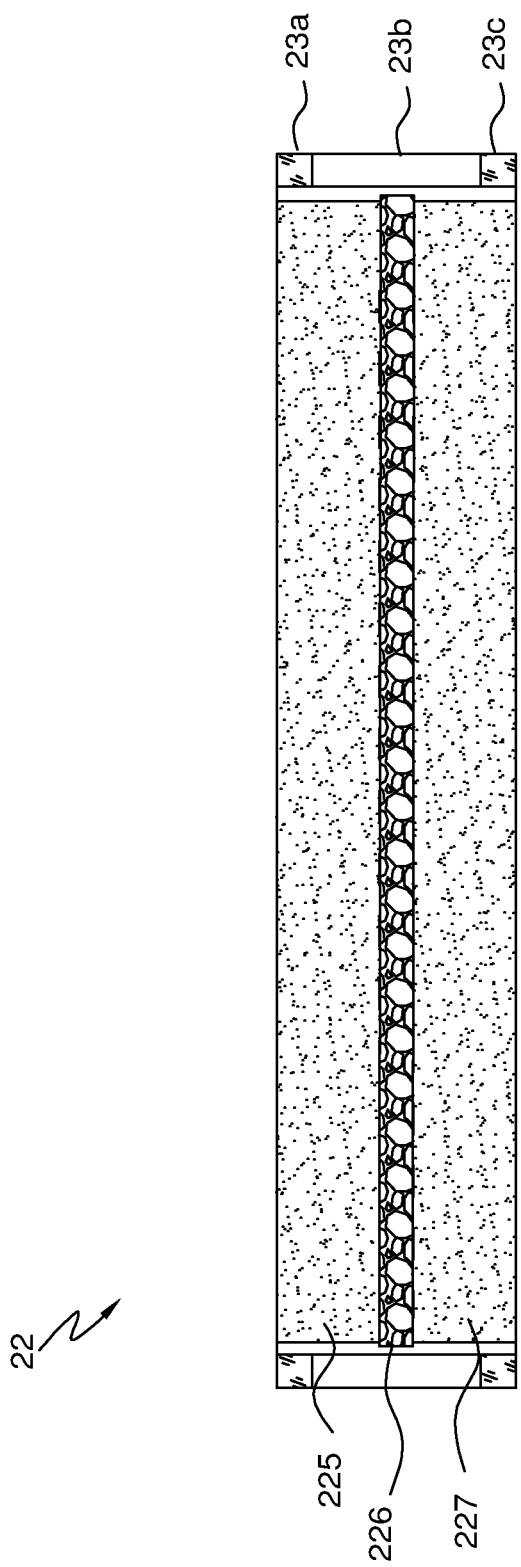
FIG. 4B shows another structural schematic diagram of the electrochemical system element and the package layer according to the present disclosure.

In addition, for easier description and identification, the electrochemical system elements 22 in the figures for illustrating the horizontal composite electricity supply structure use simple positive and negative symbols to identify the positive and negative electrical polarities for illustrating the electrical properties, instead of plotting the detailed components of the electrochemical system element 22 as shown in FIG. 4A and FIG. 4B. A person having ordinary skill in the art should know the meanings of the positive and negative polarities. Hence, the details will not be described again.

Figure 5A:
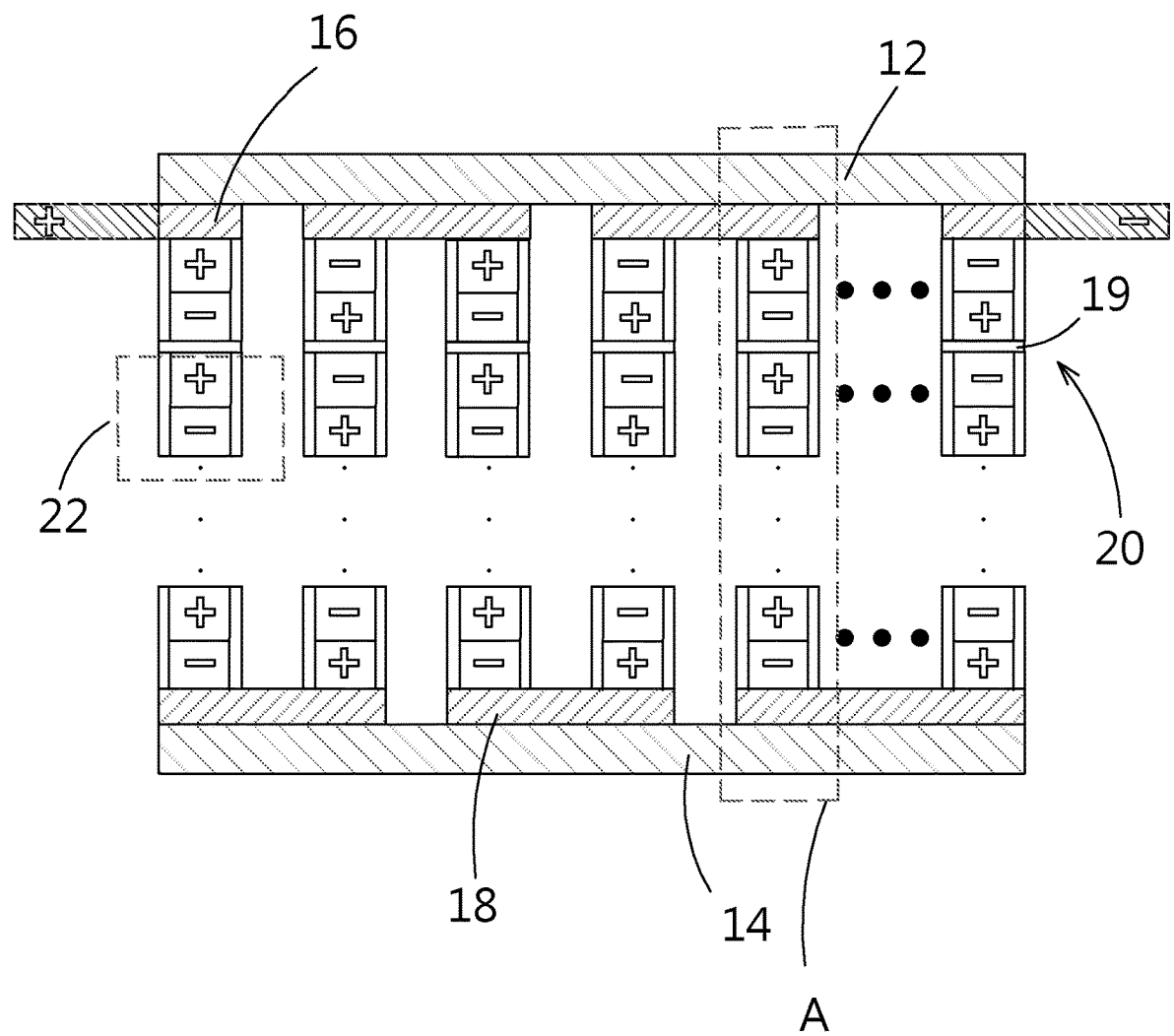
FIG. 5A shows a schematic diagram of the embodiment of FIG. 3 in which the electrochemical system element group of the horizontal composite electricity supply structure is formed by serially connecting multiple electrochemical system elements.
Figure 5B:
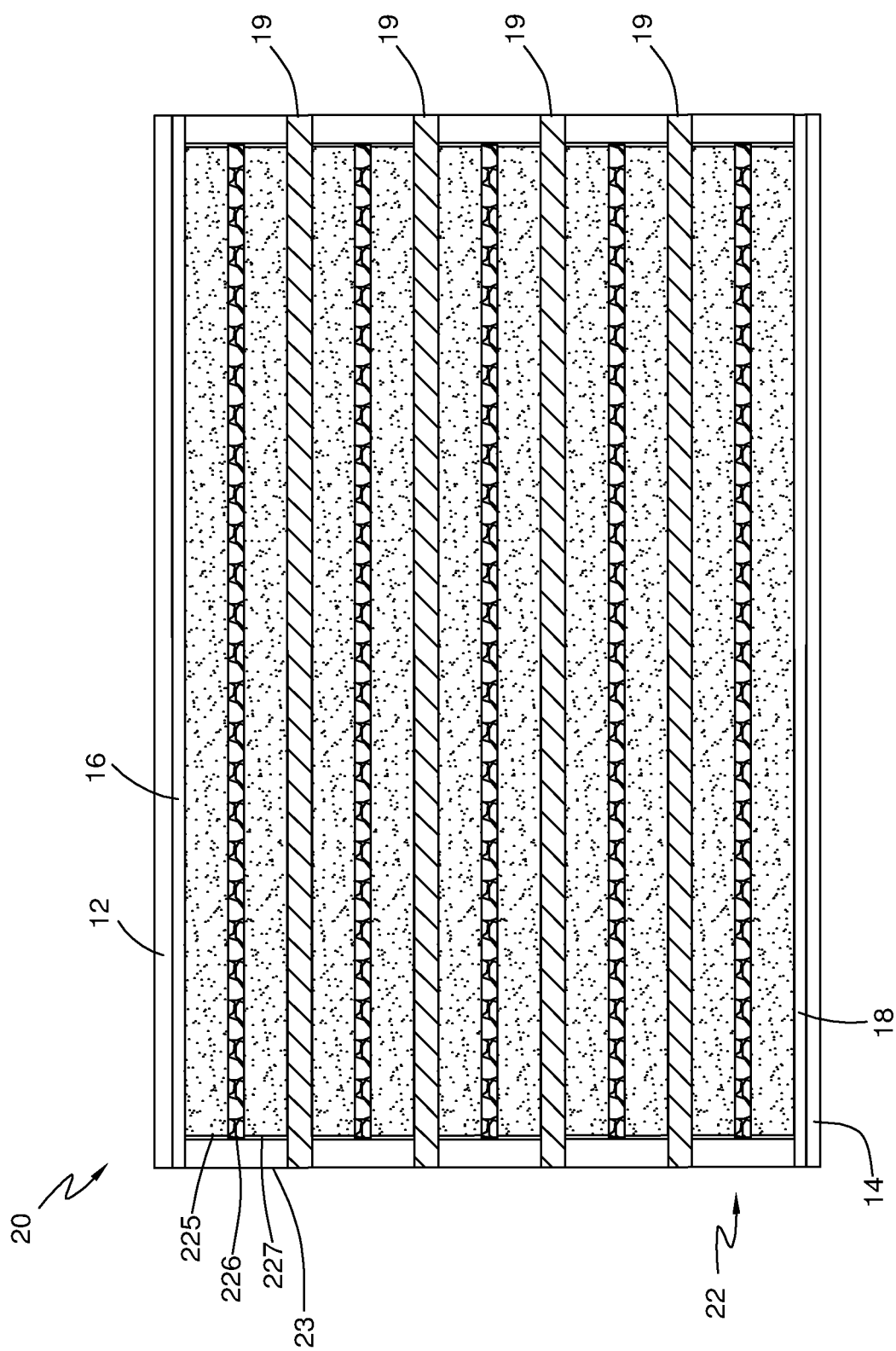
FIG. 5B shows a partially enlarged diagram of the region A in FIG. 5A.

As shown in FIG. 5A and FIG. 5B, a single electrochemical system element group 20 is formed by a plurality of vertically stacked electrochemical system elements 22 in opposite polarities to form a serial connection. The outer sides of the electrochemical system elements 22 on the outermost sides of the electrochemical system element group 20 use the electrically conductive layers 16, 18 directly as the current collecting layers. Two stacked electrochemical system elements 22 use a common current collecting layer 19 for isolating and collecting electrons. Thereby, the second active material layers 227 and the first active material layers 225 of adjacent electrochemical system elements 22 are connected electrically through the common current collecting layer 19. For example, as shown in the figures, the first active material layer 225 is the positive layer, and the second active material layer 227 is the negative layer. The second active material layer 227 of the topmost electrochemical system element 22 contacts the common current collecting layer 19. The first active material layer 225 of the adjacent (below) electrochemical system element 22 contacts the common current collecting layer 19. By stacking sequentially, the electrochemical system elements 22 connected in series in the electrochemical system element group 20 are formed. Because there is not circulation between electrolyte systems of each electrochemical system element 22, no electrochemical reactions occur between any two adjacent electrochemical system elements 22 except for charge transfer (i.e., ions will not transfer or conduct). Therefore, even though multiple electrochemical system elements 22 are connected in series to form a high voltage, the electrolyte system inside each individual electrochemical system element 22 will not be influenced. The internal voltage of each individual electrochemical system element 22 is still maintained at the voltage of a single electrochemical system element 22. Thereby, the electricity supply element group 20 with high voltage can be formed by stacking multiple electricity supply elements 22 in series without being limited by the maximum voltage (generally, around 5 volts) of the electrolyte system. In addition, the common current collecting layers 19 between adjacent electrochemical system elements 22 are shared. The contact area is much larger than the one by nickel plate soldering according to the prior art. Thereby, the internal resistance of the electrochemical system element group 20 can be reduced substantially. There is little loss in performance of the power module formed by the electrochemical system element groups 20. Besides, as the resistance is reduced, the charging and discharging speeds are increased significantly, and the heating problem is reduced significantly. Therefore, the cooling system of the electrochemical system element group 20 can be simplified and it is easier to manage and control. Thereby, the reliability and safety of the overall composite electricity supply structure can be enhanced.

Due to the requirement of contacting positive and negative electrode (active material layers 225, 227) concurrently, the materials of the electrically conductive layers 16, 18 and/or the common current collecting layer 19 as described above should have high and low voltages resistances and no oxidation reaction should occur. For example, the materials include stainless steel (SUS) or graphite. Furthermore, the materials can be the metal powders selected from the group consisting of aluminum, copper, titanium, nickel, stainless steel, and the alloys thereof. By spraying or calendaring the metal powers mixed with adhesive, the electrically conductive layers 16, 18 and/or the common current collecting layer 19 can be manufactured.

Figure 6:
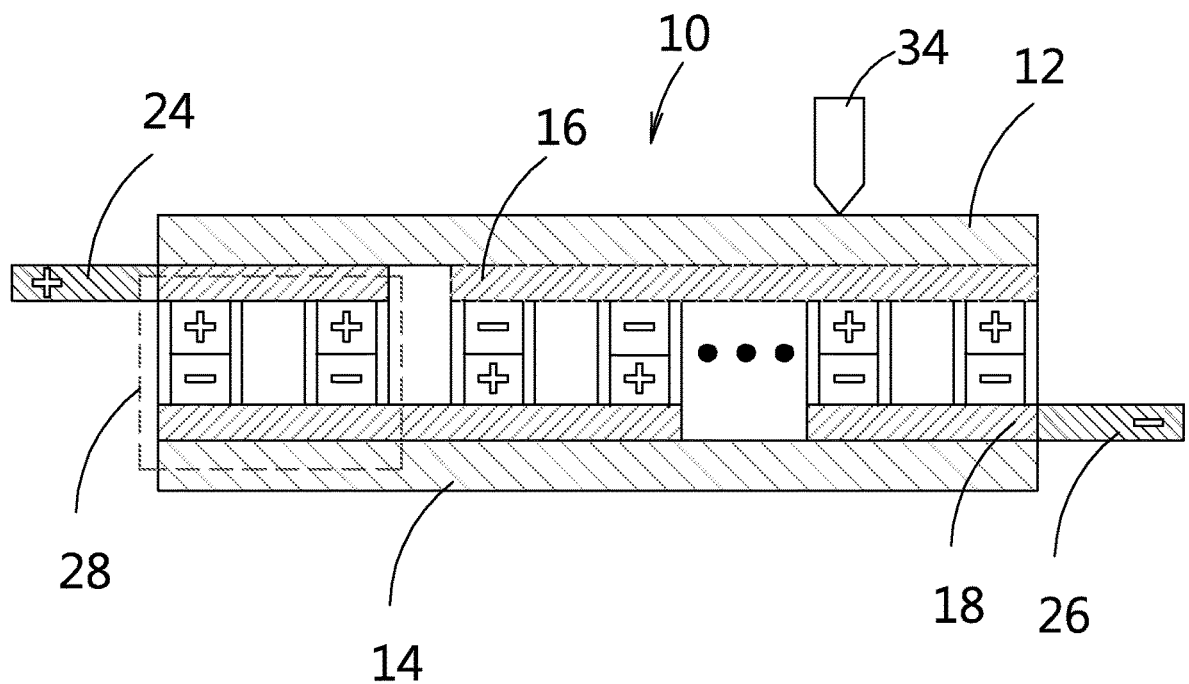
FIG. 6 shows a schematic diagram of electrochemical system element groups of the horizontal composite electricity supply structure connected internally and in parallel according to art embodiment of the present disclosure.

The horizontal composite electricity supply structure 10 according to the present disclosure further comprises a first conductive lead 24 and a second conductive lead 26. In FIG. 3, both the first conductive lead 24 and the second conductive lead 26 are connected electrically to the electrically conductive layer 16. Of course, they can be connected to different electrically conductive layers 16, 18. For example, the first conductive lead 24 is connected electrically to the electrically conductive layer 16 and the second conductive lead 26 is connected electrically to the electrically conductive layer 18, as illustrated in FIG. 6.

Figure 7:
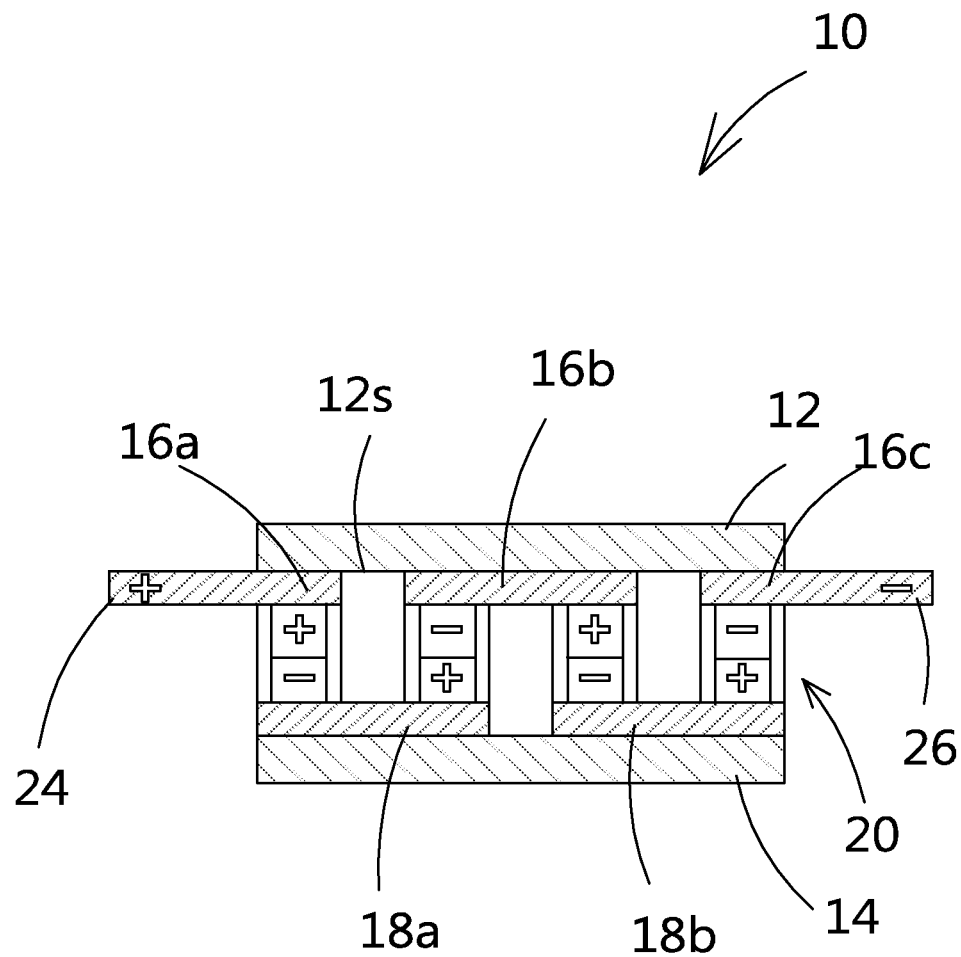
FIG. 7 shows a schematic diagram of the horizontal composite electricity supply structure according to another embodiment of the present disclosure.

Furthermore, the first conductive lead 24 and the second conductive lead 26 can be formed integrally with the electrically conductive layers 16, 18. As shown in FIG. 7, a portion of the electrically conductive layer 16a is extended to the outside of the first insulation layer 12 and acts as the first conductive lead 24, and a portion of the electrically conductive layer 16c is extended to the outside of the first insulation layer 12 and acts as the second conductive lead 26. In other words, during the process of patterning, the patterns of the first conductive lead 24 and the second conductive lead 26 are reserved.

When the first and second conductive leads 24, 26 are not formed integrally with the electrically conductive layers 16, 18, the materials of the first and second conductive leads 24, 26 are different from those of the electrically conductive layers 16, 18. In addition, the first and second conductive leads 24, 26 can be formed by soldering with or without soldering material, or by a melting method. Alternatively, conductive silver glue or conductive cloth can be adopted.

Figure 8A:
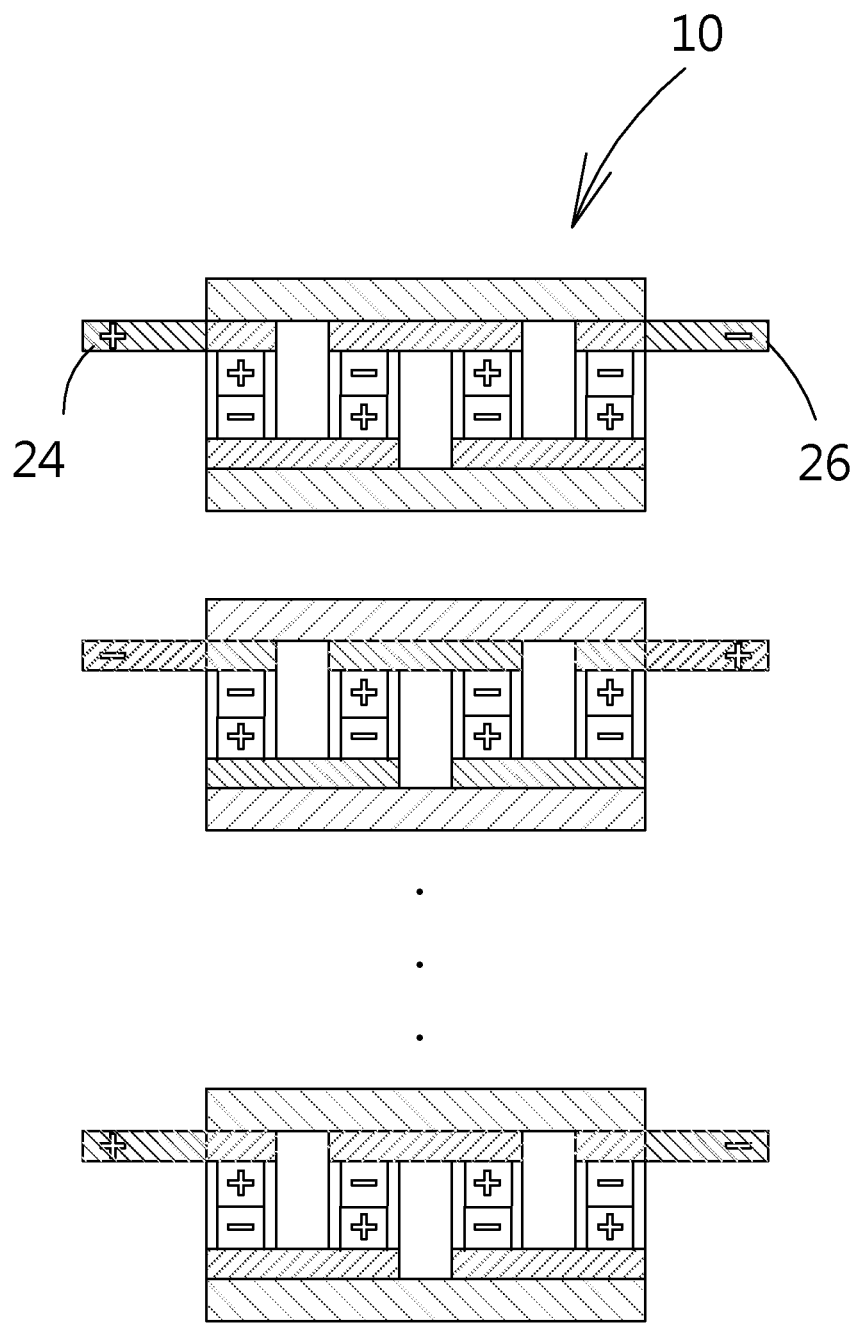
FIG. 8A shows a schematic diagram of externally and serially connecting multiple horizontal composite electricity supply structures according to an embodiment of the present disclosure.
Figure 8B:
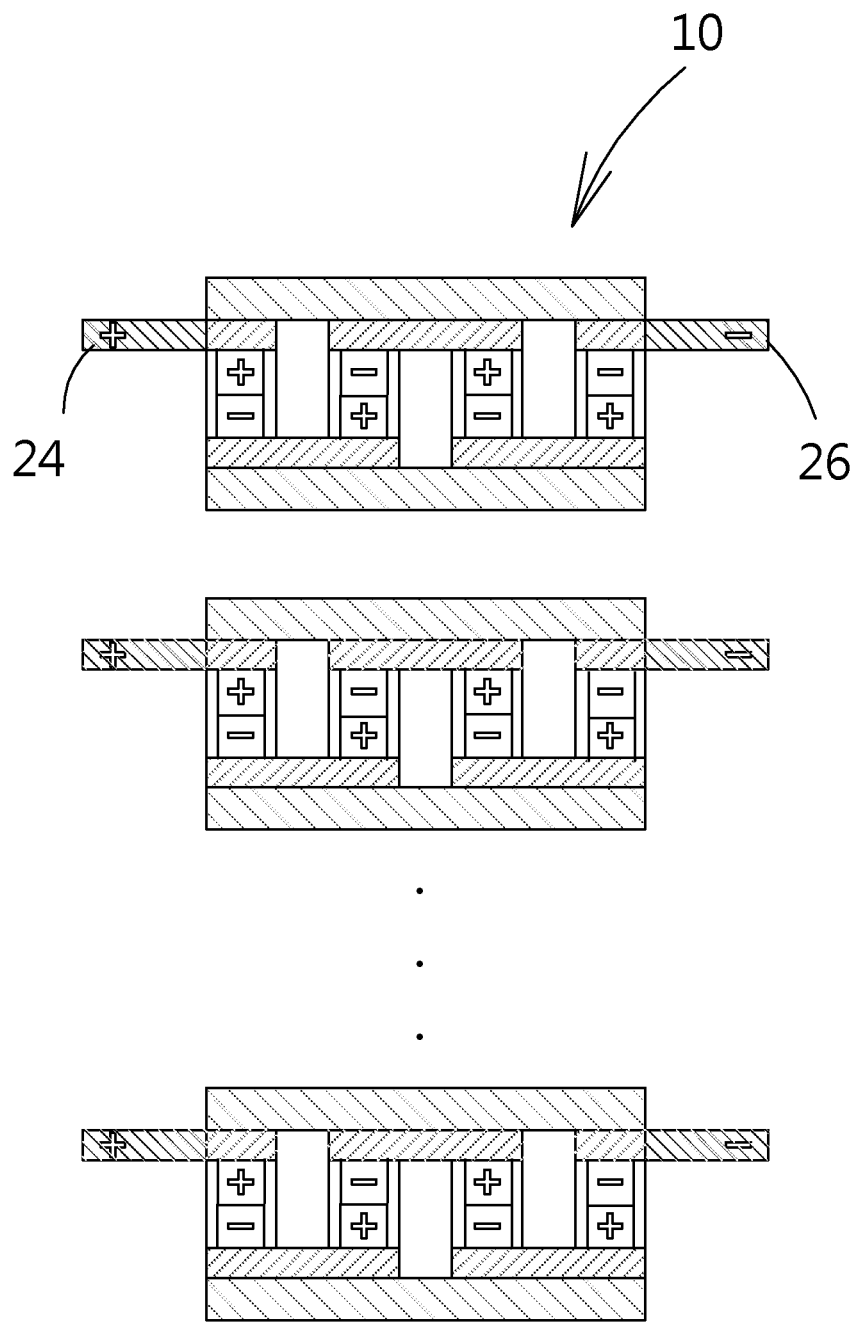
FIG. 8B shows a schematic diagram of multiple horizontal composite electricity supply structures connected internally and in parallel according to an embodiment of the present disclosure.

Under the architecture of the horizontal composite electricity supply structure according to the present disclosure, to increase the total capacity or total voltage of the battery module, the only thing to do is to perform external series/parallel connection of multiple horizontal composite electricity supply structures 10 by using the first and second conductive leads 24, 26. Then the total capacity or the total voltage of the battery module can be increased. For example, because multiple horizontal composite electricity supply structures 10 are connected in series, the total voltage cart be increased, as shown in FIG. 8A. Because multiple horizontal composite electricity supply structures 10 are connected in parallel, the total capacity cart be increased, as shown in FIG. 8B.

Figure 9:
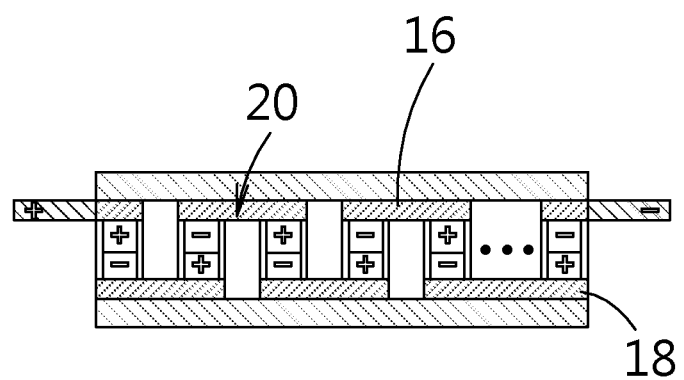
FIG. 9 shows a schematic diagram of the horizontal composite electricity supply structure according to another embodiment of the present disclosure.

The voltage of a single horizontal composite electricity supply structure 10 may be increased by adding the amount of the electrochemical system element group 20. For example, as shown in FIG. 9, compared to FIG. 3, two electrochemical system element groups 20 are added and connected in series via the electrically conductive layers 16, 18.

Please refer to FIG. 6. Two electrochemical system element groups 20 are connected in parallel to form a new set 28 by connecting the same polarity via the electrically conductive layers 16, 18. Then multiple sets 28 are connected in series by connecting the opposite polarities via the electrically conductive layers 16, 18.

Figure 10:
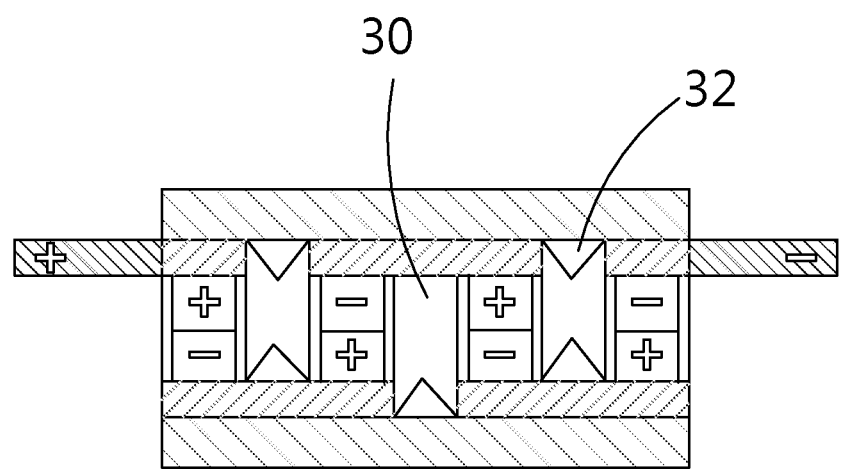
FIG. 10 shows a schematic diagram of the horizontal composite electricity supply structure according to another embodiment of the present disclosure.

Please refer to FIG. 10. The gaps between connected electrochemical system element groups 20 can act as the heat dissipation channels for the horizontal composite electricity supply structure 10. Multiple positioning members 32 are formed on the surfaces of the first insulation layer 12 and/or the second insulation layer 14 facing the electrochemical system element groups 20. The positioning members 32 are exposed outside the electrically conductive layers 16, 18 for limiting the locations of the electrochemical system element groups 20. For example, the existence of the positioning member 32 can assist to fix the electrically conductive layers 16, 18 to the correct location. Furthermore, a fluid, such as gas or liquid, can be added into the gaps 30 for increasing the heat dissipation effect.

Figure 11:
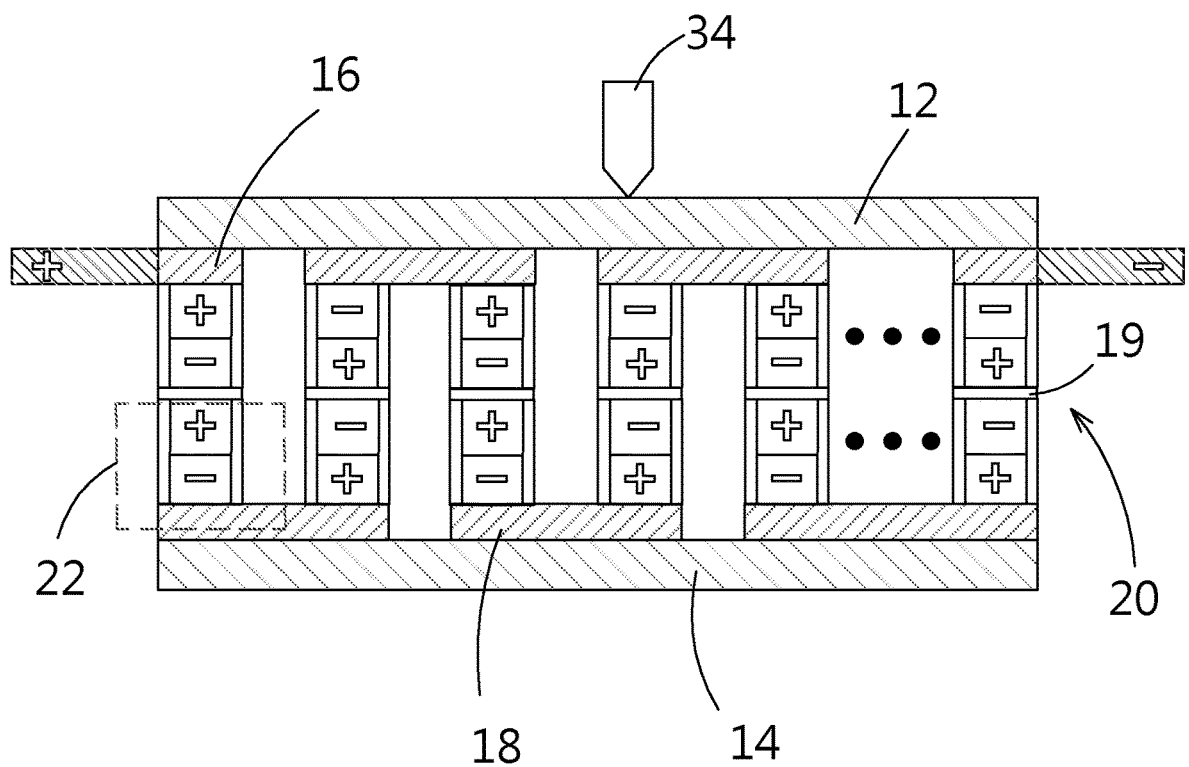
FIG. 11 shows a schematic diagram of the horizontal composite electricity supply structure according to another embodiment of the present disclosure.

The benefits of the present disclosure will be further described. For example, according to the composite electricity supply structure of the Taiwan patent application No. 106136071, twenty-four electrochemical system elements are vertically stacked and connected in series to achieve a voltage value of 24*4.2 volts. By adopting the horizontal composite electricity supply structure according to the present disclosure to achieve the same voltage value and number of electrochemical system elements, twenty-four single electrochemical system elements are connected in opposite polarities horizontally via the electrically conductive layers 16, 18, as shown in FIG. 9. Alternatively, twelve pairs of stacked electrochemical system elements can be connected in opposite polarities horizontally via the electrically conductive layers 16, 18, as shown in FIG. 11. Alternatively, another number of stacked electrochemical system elements can be adopted. Under this architecture, when a sharp metal object 34 punctures the horizontal composite electricity supply structure from the outside, the punctured object will only influence a few stacks instead of the twenty-four vertically stacked electrochemical system elements. Thereby, the danger of puncture on a massive stacked electrochemical system elements in series can be avoided effectively.

Next, when the electrochemical system element group 20 is formed by two or more electrochemical system elements 22, the serial and/or parallel configurations of the plurality of electrochemical system elements 22 are described.

Figure 12:
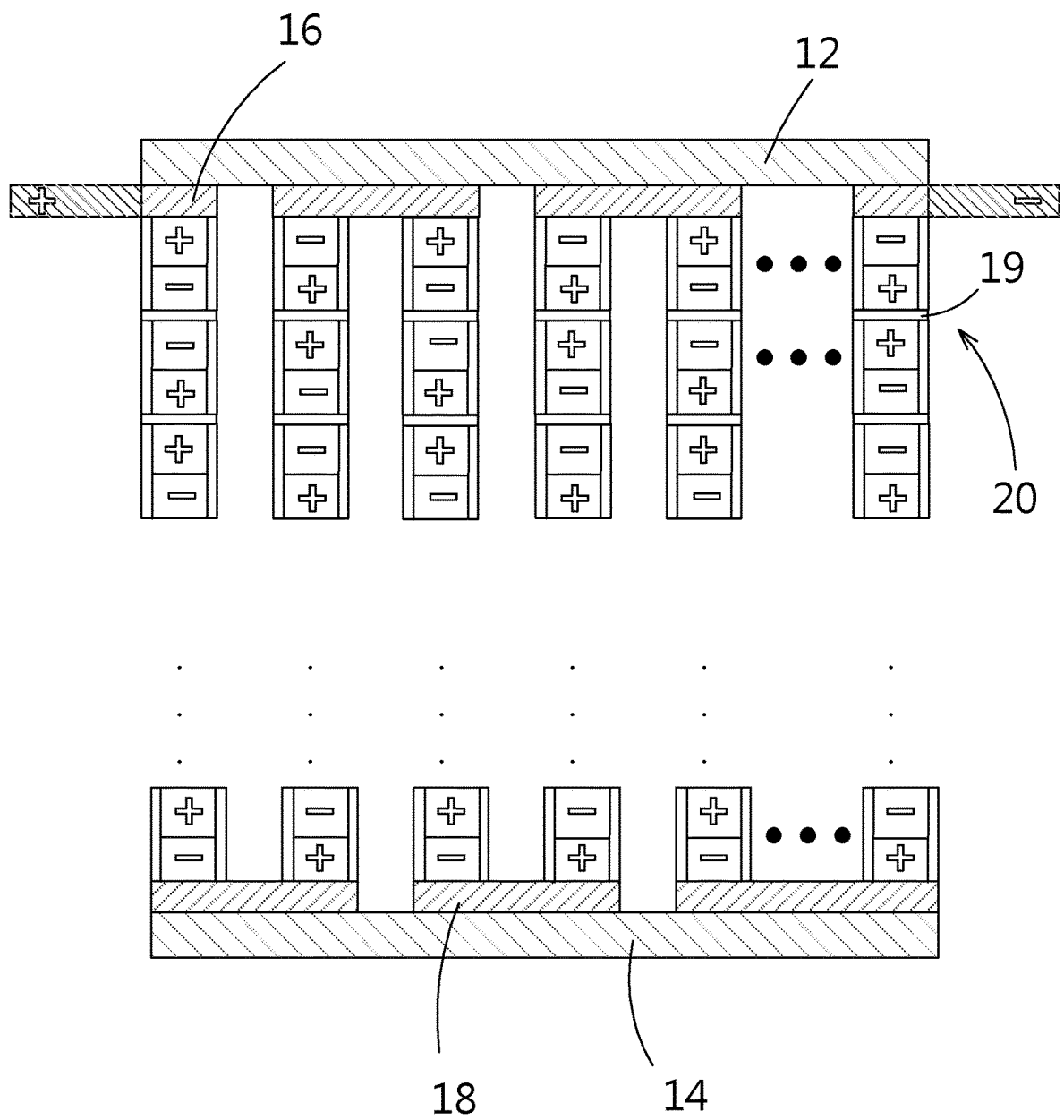
FIG. 12 to FIG. 14 show series and/or parallel electrical connection diagrams of multiple electrochemical system elements in an electrochemical system element group according to the present disclosure.
Figure 13:
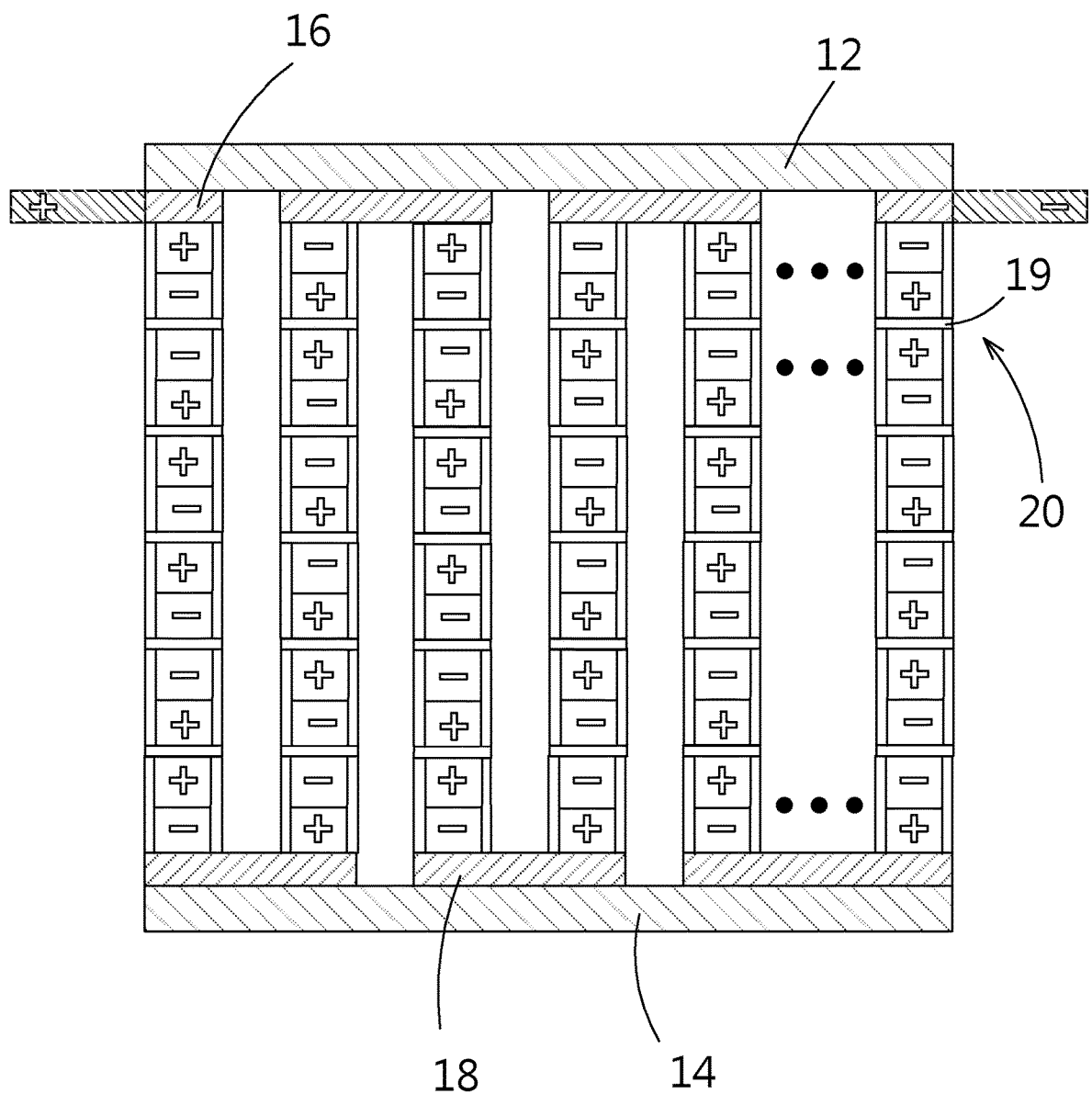
Figure 14:
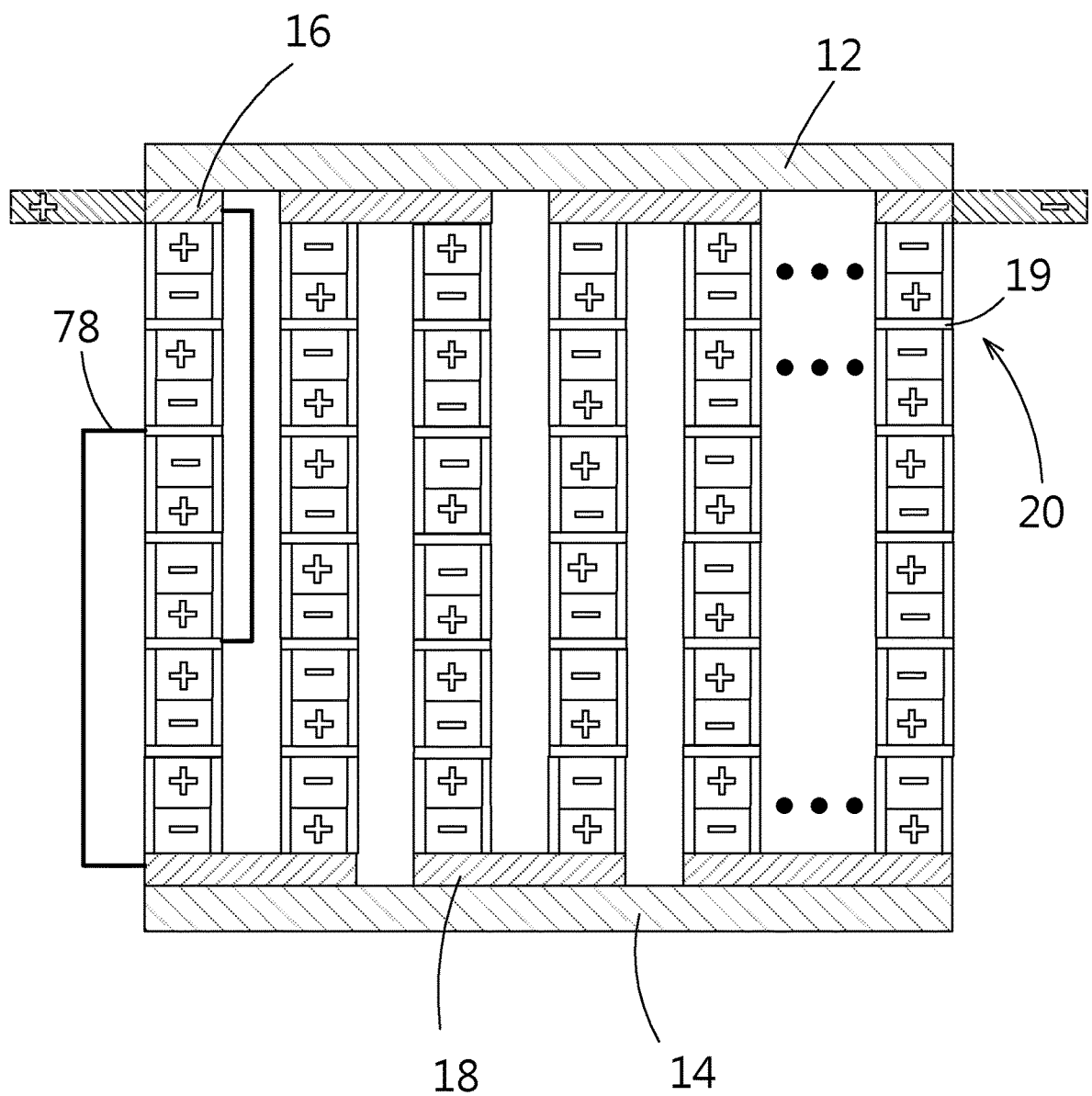
Figure 15:
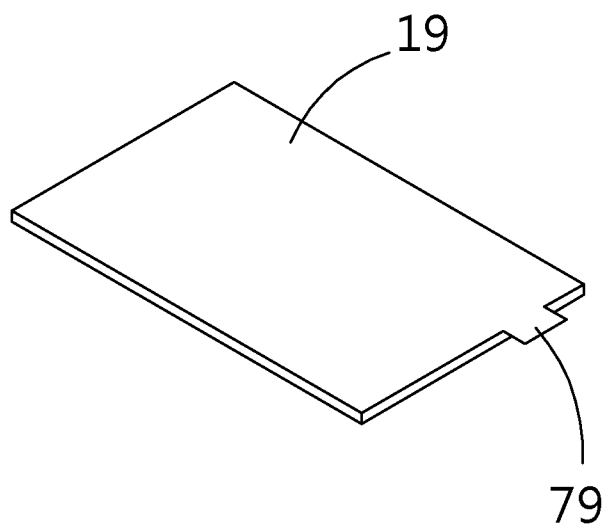
FIG. 15 shows a schematic diagram of a tab formed on the common electricity collecting layer of the electrochemical system element according to the present disclosure.

Please refer to FIG. 5A. In the figure, multiple electrochemical system elements 22 in the electrochemical system element group 20 are connected electrically in series via opposite polarities. Please refer to FIG. 12, in which multiple electrochemical system elements 22 in the electrochemical system element group 20 are connected electrically in parallel via the same polarity. Please refer to FIG. 13, in which multiple electrochemical system elements 22 are connected in parallel and then connected in series in the electrochemical system element group 20. Please refer to FIG. 14, in which multiple electrochemical system elements 22 are connected in series and then connected in parallel in the electrochemical system element group 20. In the mixed connection method as described above, suitable wires 78 can be used to connect the positive/negative terminals (the current collecting layers) of the electrochemical system element 22 to the corresponding electrically conductive layers. In addition, for connection of the wires 78 and the current collecting layers of the electrochemical system elements 22 or the common current collecting layer 19, an electrode tab 79 can be disposed at the current collecting layers 19, as shown in FIG. 15, which is used for electricity connecting.

To sum up, the present disclosure provides a horizontal composite electricity supply structure, which comprises multiple electrochemical system element groups. The electrochemical system element groups are connected in series and/or in parallel inside and extended horizontally via the electrically conductive layers for reaching a certain voltage and capacity. In addition, multiple horizontal composite electricity supply structures can also be connected in series and/or in parallel via the first and second conductive leads. Furthermore, the horizontal composite electricity supply structure according to the present disclosure comprises a first and a second insulation layers at the top and bottom for effectively preventing potential damage caused by puncture of metal objects on the electricity supply structure.

Moreover, in addition to blocking puncture effectively, the first and second insulation layers 12, 14 according to the present disclosure act as the blocking layers for electrical contact between the electrically conductive layers when multiple electricity supply structures 10 are connected.

Accordingly, the present disclosure conforms to the legal requirements owing to its novelty, nonobviousness, and utility. However, the foregoing description is only of embodiments of the present disclosure, and does not limit the scope and range of the present disclosure. Those equivalent changes or modifications made according to the shape, structure, feature, or spirit described in the claims of the present disclosure are included in the appended claims of the present disclosure.

What is claimed is:

1. A horizontal composite electricity supply structure, comprising:
   a first insulation layer;
   a second insulation layer, disposed opposed to said first insulation layer;
   two patterned electrically conductive layers, disposed opposite each other on said first insulation layer and said second insulation layer, respectively, a first one of the two patterned electrically conductive layers extending horizontally on a surface of the first insulation layer and a second one of the two patterned electrically conductive layers extending horizontally on a surface of the second insulation layer;
   a plurality of electrochemical system element groups, sandwiched between said first insulation layer and said second insulation layer and connected with said two patterned electrically conductive layers to form series connections or parallel connections between ones of the plurality of electrochemical system element groups only via said two patterned electrically conductive layers, and
   a plurality of heat dissipation channels formed between adjacent electrochemical system element groups, wherein
   each of said electrochemical system element groups is formed by a plurality of electrochemical system elements connected to each other in series, in parallel, or in both series and parallel, each of the electrochemical system elements having an electrolyte system, a periphery and a package layer on the periphery for separating the electrolyte system from the other electrolyte systems of the plurality of electrochemical system elements, vertically stacked ones of the electrochemical system elements having a common current collecting layer therebetween, adjacent electrochemical system elements of each of said electrochemical system element groups having no electrochemical reaction therebetween except for charge transferring, and
   said electrochemical system elements on outermost sides of each of said electrochemical system element groups use said two patterned electrically conductive layers directly as current collecting layers;
   wherein said plurality of heat dissipation channels are outside of each of said package layers.

2. The horizontal composite electricity supply structure of claim 1,
   wherein said electrochemical system elements each comprise:
   a first active material layer, contacting the first one of the two patterned electrically conductive layers or said common current collecting layer;
   a second active material layer, contacting the second one of the two patterned electrically conductive layers or another common current collecting layer;
   an isolation layer, sandwiched between said first active material layer and said second active material layer.

3. The horizontal composite electricity supply structure of claim 1, further comprising a first conductive lead and a second conductive lead connected electrically to the same or different ones of the two patterned electrically conductive layers.

4. The horizontal composite electricity supply structure of claim 3, wherein said first conductive lead and said second conductive lead are formed integrally with said two patterned electrically conductive layers.

5. The horizontal composite electricity supply structure of claim 1,
   wherein a plurality of positioning members are formed on at least one of the surfaces of said first insulation layer or the surface of said second insulation layer to fix a location of the two patterned electrically conductive layers.

6. The horizontal composite electricity supply structure of claim 1, wherein each electrolyte system is selected from the group consisting of gel state, liquid state, pseudo solid state, solid state, or combinations thereof.

7. The horizontal composite electricity supply structure of claim 2, wherein said plurality of electrochemical system elements use said first active material layer and said second active material layer with different polarities to contact said common current collecting layer for forming a series connection.

8. The horizontal composite electricity supply structure of claim 1, wherein each package layer includes a silicone layer and two modified silicone layers on sides of said silicone layer, wherein the modified silicone layers are modified by adjusting a ratio of addition and condensation silicone for gluing different materials.

9. The horizontal composite electricity supply structure of claim 1, wherein a fluid is added inside said heat dissipation channels.

10. The horizontal composite electricity supply structure of claim 1, wherein said two patterned electrically conductive layers and/or said common current collecting layer are made of stainless steel or graphite.

11. The horizontal composite electricity supply structure of claim 9, wherein said fluid is gas or liquid.

12. The horizontal composite electricity supply structure of claim 3, wherein when materials of said first conductive lead and said second conductive lead are different from materials of said two electrically conductive layers, said first conductive lead, said second conductive lead, and said two electrically conductive layers are connected by physical or chemical connection.

13. The horizontal composite electricity supply structure of claim 1, wherein said two patterned electrically conductive layers and/or said common current collecting layers are made of aluminum, copper, titanium, nickel, stainless steel, and the alloys thereof mixed with one or more adhesives.

* * * * *